(12) United States Patent
Slater

(10) Patent No.: US 11,085,901 B2
(45) Date of Patent: Aug. 10, 2021

(54) ACOUSTICAL MICROSCOPE

(71) Applicant: Dan Slater, La Habra Heights, CA (US)

(72) Inventor: Dan Slater, La Habra Heights, CA (US)

( * ) Notice: Subject to any disclaimer, the term of this patent is extended or adjusted under 35 U.S.C. 154(b) by 242 days.

(21) Appl. No.: 16/279,997

(22) Filed: Feb. 19, 2019

(65) Prior Publication Data

US 2019/0187099 A1 Jun. 20, 2019

Related U.S. Application Data

(63) Continuation of application No. 16/024,630, filed on Jun. 29, 2018, now abandoned, which is a continuation of application No. 15/814,808, filed on Nov. 16, 2017, now abandoned, which is a continuation-in-part of application No. 15/230,369, filed on Aug. 6, 2016, now Pat. No. 10,078,328, which is a continuation-in-part of application No. 14/463,221, filed on Aug. 19, 2014, now Pat. No. 9,709,671.

(51) Int. Cl.

| G01H 3/12 | (2006.01) |
|---|---|
| G01N 29/06 | (2006.01) |
| G10K 11/30 | (2006.01) |
| G01N 29/22 | (2006.01) |
| G01N 29/24 | (2006.01) |

(52) U.S. Cl.
CPC ......... *G01N 29/0681* (2013.01); *G01H 3/125* (2013.01); *G01N 29/0609* (2013.01); *G01N 29/222* (2013.01); *G01N 29/2418* (2013.01); *G10K 11/30* (2013.01)

(58) Field of Classification Search
None
See application file for complete search history.

(56) References Cited

U.S. PATENT DOCUMENTS 4,714,823 A * 12/1987 Spruck ................... G02B 21/06
250/205
2011/0229008 A1* 9/2011 Ikeda ................... G02B 21/368
382/133

(Continued)

FOREIGN PATENT DOCUMENTS

DE 102011054106 A1 * 4/2013 ............. G02B 21/10
WO WO-9315428 A1 * 8/1993 ............. G02B 21/00

*Primary Examiner* — Alexander A Mercado
(74) *Attorney, Agent, or Firm* — Fitzsimmons IP Law

(57) ABSTRACT

A system and method for using a microscope to aurally observe a specimen in a fluid is provided. In one embodiment of the present invention, the microscope is modified to include a first beam splitter, splitting a visual of the specimen magnified by the objective lens. A first beam is then provided to an audio frequency modulation sensing (AFMS) device, whose function is to sense photoacoustic modulation of the specimen and to extract aural data, allowing sound energy to be observed by a user (e.g., displayed on screen, played on a speaker, etc.). The second beam is provided to a second beam splitter, allowing visuals to be provided to the eyepiece and to at least one other sensor, where a second visual of the specimen is captured. The second visual can then be displayed on a screen in time synchronization with aural data provided by the AFMS device.

20 Claims, 11 Drawing Sheets

(56) References Cited

U.S. PATENT DOCUMENTS

| | | | |
|---|---|---|---|
| 2013/0265576 A1* | 10/2013 | Acher | G02B 21/0092 |
| | | | 356/369 |
| 2016/0069801 A1* | 3/2016 | Stevens | H04N 5/2253 |
| | | | 348/135 |
| 2016/0153892 A1* | 6/2016 | Knebel | G02B 21/34 |
| | | | 359/385 |
| 2021/0011266 A1* | 1/2021 | Hamilton | G02B 21/0032 |

* cited by examiner

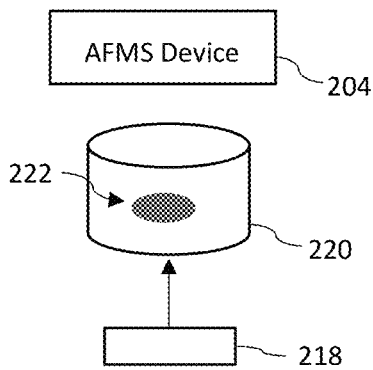
Figure 2D
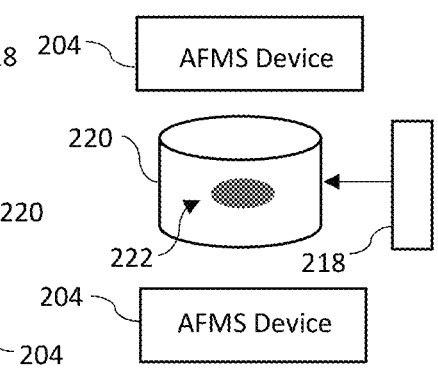
Figure 2E
Figure 2F
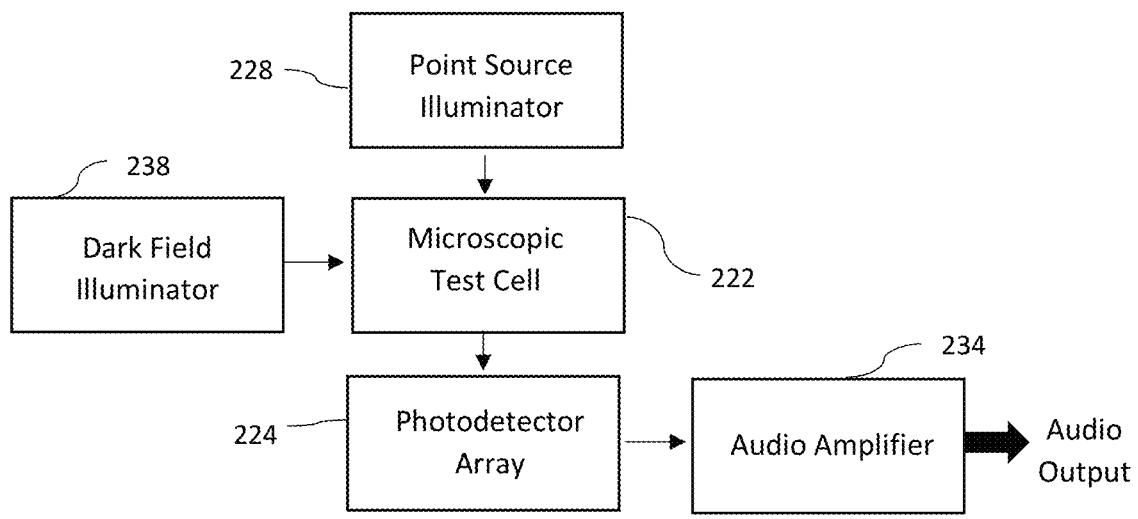
Figure 2G

ACOUSTICAL MICROSCOPE

BACKGROUND OF THE INVENTION

1. Field of the Invention

The present invention relates to a system and method for using a microscope to at least aurally observe a specimen in a fluid (e.g., water, air, etc.), or more particularly, to a microscope that has been modified to include a remote frequency modulation sensing (AFMS) device for capturing a visual of the specimen and extracting audio frequency modulated electromagnetic energy therefrom.

2. Description of Related Art

The compound microscope was invented in the early 1600s, allowing scientists, for the first time, to see things that were theretofore not known to exist. For example, the compound microscope allowed scientists to confirm the existence of cells, study microorganisms, and examine plants, animals, and fungi to a level that before was thought to be impossible. Even today, the microscope is one of the most important tools used in hospitals, clinics, and laboratories across the country.

Microscopes can produce stunning images of organisms, such as protozoa, fauna, flora, metazoa, and ciliates. However, there are two major drawbacks with such images. First, the images are generally of the organism taken out of their natural environment. For example, because organisms are generally active and move rapidly and erratically in a three dimensions space, they are usually captured, chemically stained (e.g., using iodine, ethidium bromide, etc.), and mounted onto a microscope slide before they are viewed. By way of another example, methylcellulose and/or other thickening chemicals may be added, and/or the organism may be squeezed between glass plates to slow the organism down for better viewing and reduced depth of field requirements. While such techniques allow for easier viewing, they do not allow for in situ views of healthy microscopic organisms that are naturally swimming within their aquatic micro-environments.

Second, while compound microscopes allow organisms to be visually observed, they do not provide for any aural observation. In other words, even though biologically active creatures produce sound energy, a result of both their internal and external motions, there is no current solution for observing these sounds. While millions (if not billions) of people have observed microscopic inhabitants in detail since the microscope was invented, fewer people have observed the inhabitants while they are still active in their surroundings, and very few people (if any) have listened to the sound energy produced by these inhabitants in their microscopic environments.

In our normal world sound plays an important and complementary role to sight. Since the introduction of the sound movie in 1927, and stereophonic sound movies in the late 1940's, no major feature film has been released without multichannel sound as an essential and fundamental element. The cinematic ability to see and hear detailed and dynamically changing microscopic scenery would lead to a better and more immersive understanding of these amazing very alien micro-worlds. Additional features (e.g., haptic feature, tracking feature, optical staining feature, etc.) potentially provide a most interesting and unusual way of observing and/or interacting with the micro-aquatic organisms and environments.

Thus, in light of the foregoing, it would be advantageous to develop a system and method that overcame as least some of the foregoing drawbacks, and allowed for at least aural observation of a microscopic organism in its natural environment.

SUMMARY OF THE INVENTION

The present invention provides a system and method for using a microscope to at least aurally observe an organism in a fluid (e.g., water, air, etc.). Preferred embodiments of the present invention include a standard compound microscope modified to capture visuals of the specimen, extract aural data from the visuals, and use the aural data to provide an audio output. Visuals may also be used to provide a video/image output in time synchronization with the audio output.

In one embodiment of the present invention, the microscope is modified to include a first beam splitter, splitting the visual of the specimen magnified by the objective lens (i.e., the optical signal) into two optical signals. Once the beam is split, a first beam travels upward. A second beam, however, is provided to an audio frequency modulation sensing (AFMS) device, whose function is to sense photoacoustic modulation of the specimen, which is accomplished through at least one sensor. In other words, at least one sensor is used to convert an optical signal from the specimen into an electrical signal. The audio frequency modulated electromagnetic energy in the electrical signal is then extracted (e.g., amplified, etc.), allowing the sound energy to be observed by a user (e.g., displayed on a screen, played on a speaker, etc.).

In this embodiment, the first beam (from the first beam splitter) may travel upward into a second beam splitter, where the first beam is split into two separate beams (or optical signals). The first beam is provided to the eyepiece, allowing the user to visualize the specimen in real time. The second beam is provided to at least one other sensor, where a second visual of the specimen is captured. The visual can then be displayed on a screen in time synchronization with the aural data.

In another embodiment of the present invention, only one beam splitter is required. This is because a single sensor (or single set of sensors), e.g., as included in a digital video camera, is used to capture visuals of the specimen. The captured visuals are then provided to the display, e.g., allowing the visuals to be displayed to the user, and provided to the AFMS device, e.g., allowing aural data to be extracted. The aural data is then output and used as discussed above (e.g., in time synchronization with the video data, etc.). Such an embodiment is advantageous in that it only requires a single sensor (or set of sensors) to capture visuals of the specimen. The captured visuals can then be used to both generate video and audio outputs. And if a digital video camera is used, and different pixels (or sets of pixels) are used to capture different visuals, stereophonic (or multi-channel) sound can be generated, providing a cinematic, multimedia experience for the user.

In the foregoing embodiments, the beam splitter in the single beam splitter embodiment, and the second beam splitter in the dual beam splitter embodiment, are used to provide visuals of the specimen in real time to the user via the eyepiece. It should be appreciated, however, that the eyepiece, and therefore the beam splitter in the single beam splitter embodiment, and the second beam splitter in the dual beam splitter embodiment, are not limitations of the present invention. For example, a microscope where a digital camera is used to capture visuals of the organism, where the visuals are then provided (e.g., via a video output) to a display (e.g., an LCD display, etc.), allowing the user to visualize the organism in real time (i.e., by watching the display), is within the spirit and scope of the present invention.

As discussed above, one objective of the present invention is to view organisms in their natural, aquatic environment. However, because sound energy produced by these organisms is extremely low, and therefore difficult to capture and extract, the inventor has discovered that use of a water immersive objective lens is advantageous to the present invention. A water immersive objective is a specially designed objective lens used to increase the resolution of the microscope. This is achieved by immersing both the lens and the specimen in water, which has a higher refractive index (~1.33) than air (~1.0003), and a similar refractive index to most living cells (~1.35), thereby increasing the numerical aperture of the objective lens. By moving the objective below the water surface, we can also eliminate visual distortions resulting from water ripple.

The inventor has also discovered that optical staining, such as dark-field, is advantageous to the present invention. Dark-field techniques can be achieved, for example, using a block that prevents the illumination from directly entering the objective lens, only allowing reflected or scattered light to enter the objective lens. This has the result of obliquely illuminating the specimen allowing the acoustic energy to be sensed with an improved signal to noise ratio. Similar benefits can be achieved using other optical staining techniques, as discussed in greater detail below.

Because certain organisms move rapidly, a tracking system may be used to position (or maintain) the organism under the objective lens. For example, a manual tracking system may be employed that includes a clamp that goes around a container (e.g., Petri dish) that houses the organism (not shown), where the container is supported vertically via a stage. While knobs may be used to move the stage, and therefore the container, in the Z direction, the clamp may be used to move the container in a two-dimensional space (e.g., in the X and/or Y directions). The tracking system may include a handle configured to be gripped by the user and used to move the container in relation to the stage and/or objective lens.

In other embodiment, the tracking system may be motorized and/or automated. For example, in one embodiment, a joystick may be used to control a plurality of motors, which are used to move the container in relation to the objective lens. In another embodiment, software operating on the CPU may be used to automatically track a specimen within the container. This may be accomplished, for example, by using software to monitor images of a specimen. If the software detects movement, motors can be controlled to reposition the specimen with respect to the objective lens. The foregoing can be used to move the container within a two-dimensional space (e.g., in the X and/or Y directions) or within a three-dimensional space (e.g., in the X, Y, and/or Z directions).

A more complete understanding of a system and method for using a microscope to at least aurally observe a specimen in a fluid (e.g., water, air, etc.) will be afforded to those skilled in the art, as well as a realization of additional advantages and objects thereof, by a consideration of the following detailed description of the preferred embodiment. Reference will be made to the appended sheets of drawings, which will first be described briefly.

BRIEF DESCRIPTION OF THE DRAWINGS

FIGS. 2D-F illustrate alternate embodiments of the present invention, where light is projected upward, toward an AFMS device that is above the specimen, downward toward an AFMS device that is below the specimen, and from the side, allowing reflective light to be captured by an AFMS device that is either above or below the specimen;

FIG. 2G illustrates an embodiment of the present invention where light from a point source illuminator and/or dark field illumination is received (either directly or indirectly) (e.g., reflected from or scattered by the test cell) by a photodetector array and used to generate a single or multi-channel audio signal;

DETAILED DESCRIPTION OF THE PREFERRED EMBODIMENT

Preferred embodiments of the present invention include a microscope modified to capture first and second visuals of a specimen, where aural data is extracted from the second visual of the specimen. Video data from the first visual is then output in time synchronization with the aural data. It should be appreciated that while the present invention is described in terms of a compound microscope being modified to at least aurally observe an organism, the present invention is not so limited. Features described herein can be used in conjunction with any viewing device (e.g., telescope, binoculars, magnifying glass, etc.), with or without optics (e.g., objective lens, etc.), with or without optical staining techniques (e.g., dark-field, shadowgraph, etc.), to aurally observe any specimen (e.g., cells, insects, animals, plants, fungi, etc.).

Figure 1:
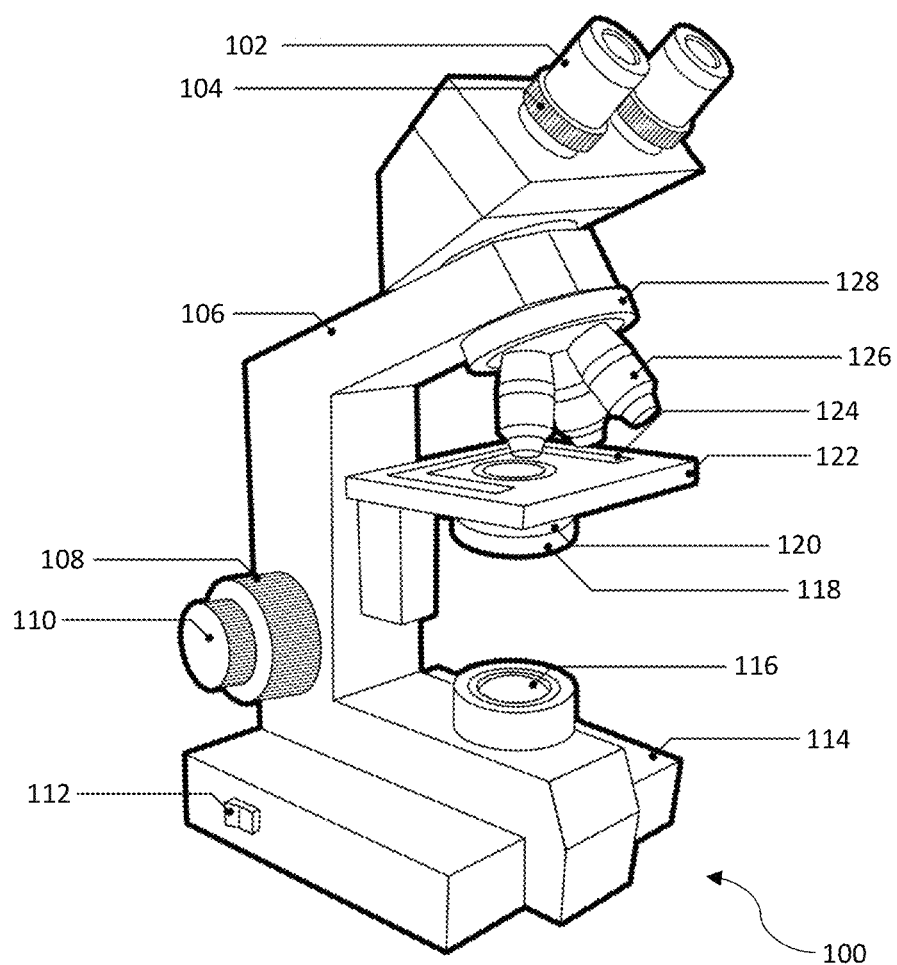
FIG. 1 illustrates a prior art compound microscope, which can be used to visually observe a specimen.

A prior art compound microscope 100 is shown in FIG. 1. Such a microscope can generally be broken down into three portions, i.e., the head/body; the base; and the arm. The head/body houses the optical parts in the upper part of the microscope, including an eyepiece (or ocular lens) 102, a diopter adjustment 104, a nose piece 128, and an objective lens 126. The base 114 of the microscope 100 houses a light source (or mirror) 116, and may include an on/off switch 112. The arm 106 connects the base 114 to the head/body, and generally includes a stage 122, slide holders 124, a condenser 120, and an iris diaphragm 118.

The eyepiece (or ocular lens) 102 is what a user looks through at the top of the microscope 100. Typically, standard eyepieces have a magnifying power of 10×. Optional eyepieces of varying power are available, typically from 5×-30×. If there are two eyepieces, the diopter adjustment 104 can be used to adjust for inconsistencies between the user's left and right eye. The nosepiece 128 houses the objective lens 126, which is the primary optical lens on the microscope 100. Objective lenses 126 generally range from 4×-100×, and can be either forward or rear-facing. The stage 122 is where the specimen is placed, and includes an aperture, allowing light from the light source 116 to reach (e.g., illuminate) the specimen. The condenser 120 is used to collect and focus the light from the light source 116 onto the specimen, and the iris diaphragm 118 is used for light control and changing the illumination angle. Light intensity is generally controlled by the iris diaphragm 118 when it is well removed from the conjugate focus location, and illumination angle is controlled when the illumination position is at the focus of the iris diaphragm 118. In certain microscopes, two iris diaphragms (not shown) are used, where the first one controls light intensity and the second one controls illumination angle. The on/off switch 112 provides power to the light source 116 (and/or other electrical features on the microscope 100), and the knobs 108, 110 are used to focus the microscope on the specimen.

Figure 2A:
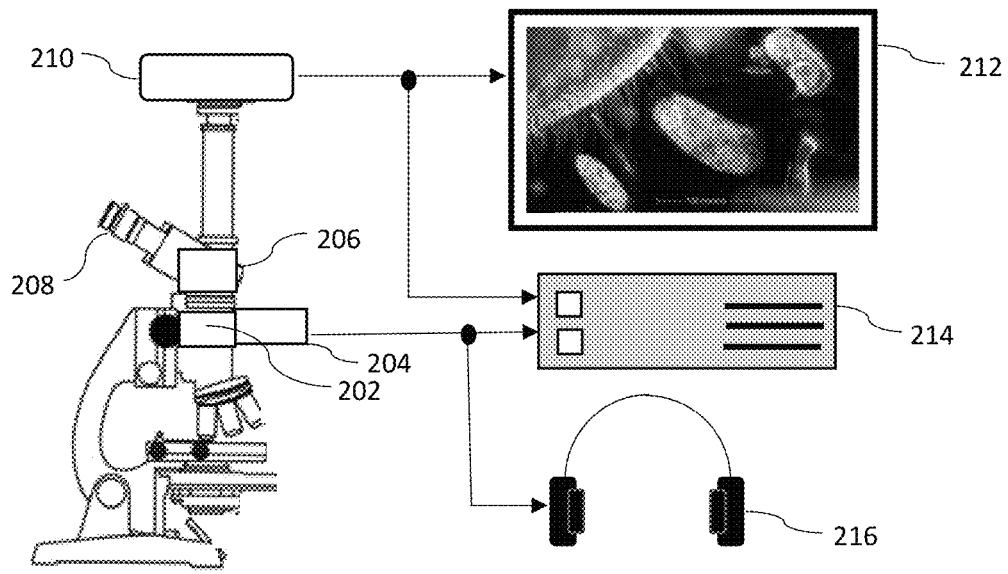
FIG. 2A illustrates a compound microscope modified in accordance with one embodiment of the present invention, which can be used to both visually and aurally observe a specimen.
Figure 3:
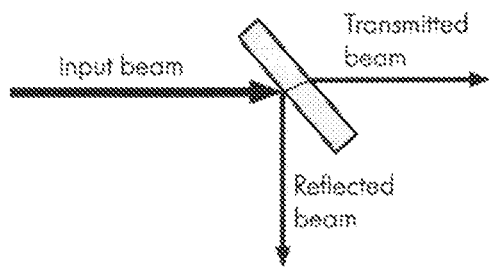
FIG. 3 illustrates a beam splitter that can be used to generate a transmit beam (e.g., first optical signal) and a reflected beam (e.g., second optical signal) from an input beam (e.g., received optical signal)

A first embodiment of the present invention is shown in FIG. 2A. While the microscope depicted in FIG. 2A is like the one shown in FIG. 1 in that it includes a light source, a stage, an objective lens, and an eyepiece 208, it further includes features that allow the specimen to be both visually and aurally observed. For example, the microscope may include a first beam splitter 202, splitting the visual of the specimen magnified by the objective lens (i.e., the optical signal) into two optical signals. Such a beam splitter can be seen in FIG. 3. In generally, it functions by taking an input beam, passing (or transmitting) a portion thereof, and reflecting the remaining portion. It can be constructed using a cube made from two triangular glass prisms, which are glued together at their base. The thickness of the resin layer is adjusted such that half of the light incident through one "port" is reflected, and the other half is transmitted due to frustrated total internal reflection. It should be appreciated that the present invention is not limited to any particular beam splitter, and all types and constructions generally known to those skilled in the art (e.g., a polarizing beam splitter, those involving pellicle mirrors, those involving dichroic optical coatings, etc.) are within the spirit and scope of the present invention.

Once the beam is split, a first beam travels upward, and will be discussed in detail below. The second beam, however, is provided to an audio frequency modulation sensing (AFMS) device 204, whose function is to capture audio frequency modulated data from the specimen, which is accomplished through at least one sensor (e.g., one or more photodetector, pixel, solar array, solar cell, etc.). In other words, at least one sensor is used to convert an optical signal from the specimen into an electrical signal. The audio frequency modulated electromagnetic energy in the electrical signal is then extracted, allowing the sound energy to be observed by a user (e.g., displayed on screen, converted into mechanical energy using at least one transducer, etc.). It should be appreciated that the term "photodiode" is used herein in its broad sense, to include any device that converts an optical signal (or portion thereof) into an electrical signal. It should also be appreciated that the term "extracted" (and variations thereof) is used herein in its broad sense, to include any device that allows, aids, or enhances the observation of sound energy included in the signal provided by the photodiode.

Figure 13:
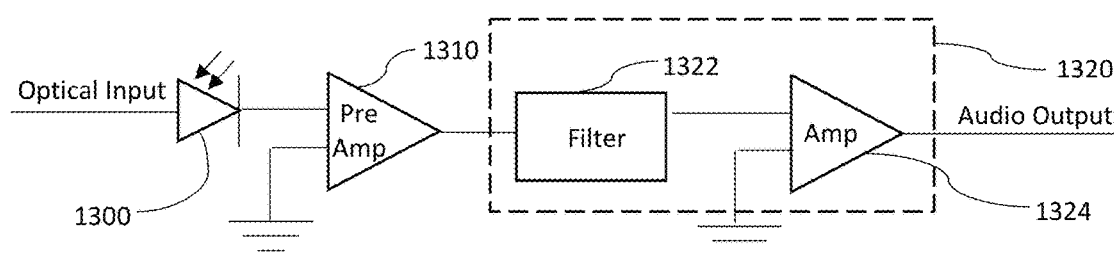
FIG. 13 illustrates an AFMS device in accordance with one embodiment of the present invention.

By way of example only, FIG. 13 shows an exemplary AFMS device, which includes at least one photodiode 1300 for converting an optical input (e.g., magnified visual of the specimen, etc.) into electrical energy, and an extraction circuit for providing an audio output (e.g., an output comprising aural data). The extraction circuit may include a preamplifier 1310 for amplifying the electrical signal, and may further include at least one filter (e.g., low-pass, high-pass, band-pass, band-stop, notch, adaptive, etc.) 1322 for removing unwanted frequencies, artifacts, noise, etc., and at least one other amplifier 1324. It should be appreciated that the post-processing circuitry 1320 may either be included in the AFMS device, or included in a separate device, constructed especially for enhancing sound (e.g., a studio sound recorder, a computer running sound recording software, etc.) (not shown). It should also be appreciated that the present invention is not limited to the AFMS device shown in FIG. 13. Other AFMS devices that include additional, different, or fewer components are within the spirit and scope of the present invention. For example, different AFMS devices are discussed and depicted in a patent application entitled "Solar Array Remote Acoustic Sensing (SARAS)," filed on Aug. 6, 2016, bearing Ser. No. 15/230,369. Those devices, including their construction and use (see, e.g., FIG. 20), are specifically incorporated herein by reference.

Referring back to FIG. 2A, once aural data is extracted from the magnified visual of the specimen, the aural data can be provided to a recording device 214 and/or at least one transducer, such as those found in speakers 216. By providing aural data to the speakers 216, the aural data can be converted into sound, allowing the user to aurally observe (e.g., listen to) the specimen. By providing aural data to the recording device 214, aural data can be recorded and played back at a subsequent time (e.g., in time synchronization with video data). As previously discussed, the recording device can also be used to enhance the aural data (e.g., filter, amplify, etc.) before it is played for the user. It should be appreciated that the present invention is not limited to aural data being distributed as shown in FIG. 2A. For example, aural data may only be provided to a speaker, may only be provided to a sound recorder, or may be provided to a speaker via the sound recorder. By way of yet another example, aural data may only be provided to a computer, allowing it to be stored, enhanced, or displayed on a screen (see, e.g., FIG. 9). It should also be appreciated that aural data may be extracted from visuals captured by a single sensor, resulting in monophonic (or single channel) sound, or it may be extracted from visuals captured by a plurality of sensors (e.g., a plurality of photodiodes, a plurality of pixels, etc.), resulting in stereophonic (or multi-channel) sound. This feature is discussed at length in Ser. No. 15/230,369 (see, e.g., p. 25, l. 1-p. 26, l. 6), and is specifically incorporated herein by reference.

As previously discussed, the first beam splitter 202 results in two beams, one of which travels upward into a second beam splitter 206. The second beam splitter is like the first beam splitter in that it splits an input beam (e.g., a visual of the specimen magnified by the objective lens) into two optical signals. The first optical signal is provided to the eyepiece, allowing the user to visualize the specimen in real time. The second optical signal is provided to at least one other sensor 210, where a second visual of the specimen is captured. This visual can then be displayed on a screen 212 (e.g., a computer screen, an LCD monitor, a plasma television, etc.) and/or provided to a digital video recorder (DVR) 214.

Figure 2B:
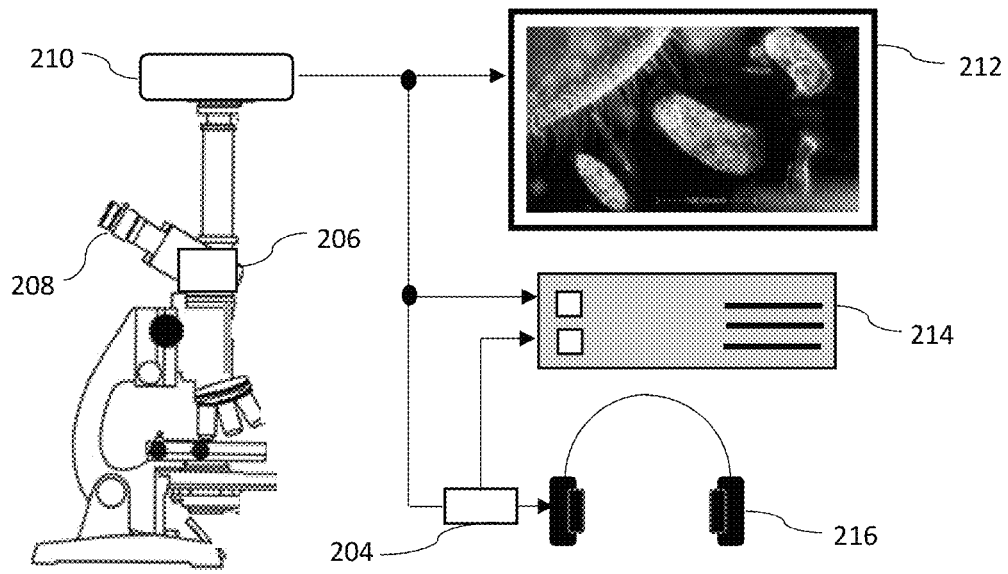
FIG. 2B illustrates a compound microscope modified in accordance with another embodiment of the present invention, which can be used to both visually and aurally observe a specimen.

It should be appreciated that a single recording device can be used to record and/or modify both video and audio data (as shown), or a first recording device can be used to record and/or modify video and a second recording device (not shown) can be used to record and/or modify audio. It should also be appreciated that the present invention is not limited to video data being distributed as shown in FIG. 2A. For example, video data may only be provided to a display, may only be provided to a DVR, or may be provided to a display via the DVR. By way of yet another example, video data may only be provided to a computer, allowing it to be stored, adjusted, or displayed on a screen (see, e.g., FIG. 9). It should further be appreciated that the present invention is not limited to the use of at least one other sensor 210, as shown in FIG. 2A. For example, a single sensor (or set of sensors) may be used to capture visuals for both audio and video data, as shown in FIG. 2B (discussed below). By way of yet another example, the eyepiece 208 may be the only means for the user to view the specimen during aural observation.

It should also be appreciated that, if at least one other sensor is used to capture a second visual of the specimen, the sensor can be any sensor generally known to those skilled in the art, including, but not limited to those found in digital video cameras. The visuals captured can be images or video, can be captured using any frame rate (e.g., 240 FPS is sufficient to capture audio generated by most microorganisms (~50 Hz), at least 4000 FPS (e.g., a high-speed digital camera) may be necessary to provide an adequate audio bandwidth while being sensitive to weak optical modulation levels, etc.). Different devices for capturing visuals are discussed and depicted in Ser. No. 15/230,369 (see, e.g., p. 18, l. 29-p. 19, l. 20, and p. 25, l. 26-p. 26, l. 6), and are specifically incorporated herein by reference.

A second embodiment of the present invention is depicted in FIG. 2B. This embodiment is substantially the same as the embodiment depicted in FIG. 2A except that only a single beam splitter 206 is needed. This is because a single sensor (or single set of sensors) 210 (e.g., as included in a digital video camera) is used to capture visuals of the specimen, as magnified by the objective lens. The captured visuals are then provided to the display 212 (e.g., allowing the visuals to be displayed to the user), to the DVR 214 (e.g., allowing the visuals to be recorded and/or adjusted), and to the AFMS device 204 (e.g., allowing aural data to be extracted). The aural data is then output and used as discussed above (e.g., in time synchronization with the video data, etc.) (e.g., where it is recorded, adjusted, played, etc.). Such an embodiment is advantageous in that it only requires a single sensor (or set of sensors) to capture visuals of the specimen. The captured visuals can then be used to generate both video and audio outputs. And if a digital video camera is used, and different pixels (or sets of pixels) are used to capture different visuals, stereophonic (or multi-channel) sound can be generated, providing a cinematic, multimedia experience for the user.

Figure 2C:
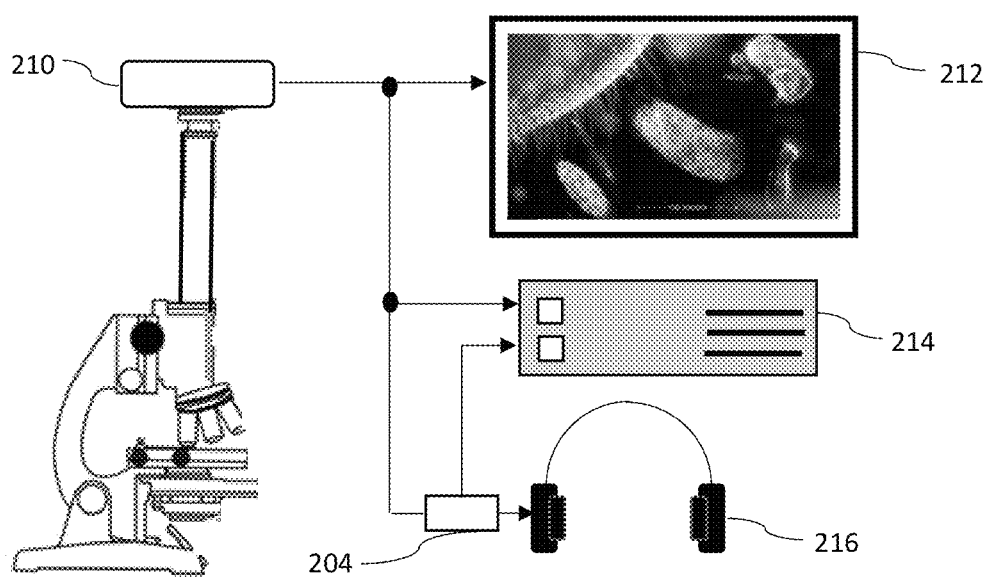
FIG. 2C illustrates a compound microscope modified in accordance with yet another embodiment of the present invention, which can be used to both visually and aurally observe a specimen.

A third embodiment of the present invention is depicted in FIG. 2C. This embodiment is substantially the same as the embodiment depicted in FIG. 2B except that it does not require a beam splitter. Instead, a single sensor (or single set of sensors) 210 (e.g., as included in a digital video camera) is used to capture visuals of the specimen, as magnified by the objective lens. The captured visuals are then provided to the display 212 (e.g., allowing a user to visualize the organism in real time), to the DVR 214 (e.g., allowing the visuals to be recorded and/or adjusted), and to the AFMS device 204 (e.g., allowing aural data to be extracted). The aural data is then output and used as discussed above (e.g., in time synchronization with the video data, etc.) (e.g., where it is recorded, adjusted, played, etc.). Such an embodiment is advantageous in that it only requires a single sensor (or set of sensors) to capture visuals of the specimen, and does not require a beam splitter. The captured visuals can then be used to generate both video and audio outputs. And if a digital video camera is used, and different pixels (or sets of pixels) are used to capture different visuals, stereophonic (or multi-channel) sound can be generated, providing a cinematic, multimedia experience for the user.

It should be appreciated that while the present invention has been described in terms of illuminating a specimen from below, and using an AFMS device (e.g., together with an objective lens) to capture visuals of the specimen, the present invention is not so limited. For example, as shown in FIG. 2D, a specimen 222 (e.g., an organism, etc.) in its natural environment 220 (e.g., water, etc.) can be illuminated by a light source (e.g., an LED, etc.) from below, and an AFMS device 204 located above the specimen 222 can be used to receive optical signals and to extract aural data therefrom. By way of another example, as shown in FIG. 2E, the specimen 222 (e.g., an insect, etc.) in its environment 220 (e.g., air, etc.) can be illuminated by a light source 218 (e.g., the sun, etc.) from above, and an AFMS device 204 located below the specimen 222 can be used to receive optical signals and to extract aural data therefrom. By way of yet another example, as shown in FIG. 2F, the light source 218 (point source or otherwise) can be positioned to the side of the specimen 222, allowing only (or primarily) reflected (or refracted) light to be captured by the AFMS device 204. Such an embodiment has advantages that are discussed in greater detail below, with respect to optical staining techniques. In either embodiment, the visuals can be magnified, or not (e.g., using an objective lens, etc.), depending on the specimen that is being observed.

In yet another embodiment, the system may include combinations of the foregoing. For example, as shown in FIG. 2G, a microscopic test cell 222 (or some other organism, insect, etc.) may be illuminated in a way that maximizes the acousto-optic modulation depth. This may be accomplished, for example, using a point of source illuminator 228 (e.g., using "shadowgraph" techniques, etc.) and/or a dark-field illuminator 238 (e.g., dark-field oblique illumination, laser scatter, etc.). A photodetector 224 (e.g., a photodiode, such as a solar cell, for monophonic, a photodiode array, such as a solar array, for stereophonic, etc.) could then be used to convert the received optical signal into an electrical signal, and at least one audio amplifier 234 could be used to amplify at least an audio frequency component included therein. As discussed above, other circuitry could be used to "clean up" the aural data. A video output could also be generated (e.g., using the same array, a different array, etc.). Again, an objective lens (not shown) may or may not be used, depending on the specimen that is being observed.

As discussed above, one objective of the present invention is to view organisms in their natural, aquatic environment. However, because sound energy produced by organisms is extremely low, and therefore difficult to capture and extract, the inventor has discovered that use of a water immersive objective lens is advantageous to the present invention. A water immersive objective is a specially designed objective lens used to increase the resolution of the microscope. This is achieved by immersing both the lens and the specimen in water, which has a higher refractive index (~1.33) than air (~1.0003), and a similar refractive index to most living cells (~1.35), thereby increasing the numerical aperture of the objective lens. Also, by moving the objective below the water surface, visual distortions resulting from water ripple (e.g., defocusing, deforming, etc.) can be eliminated.

Figure 4:
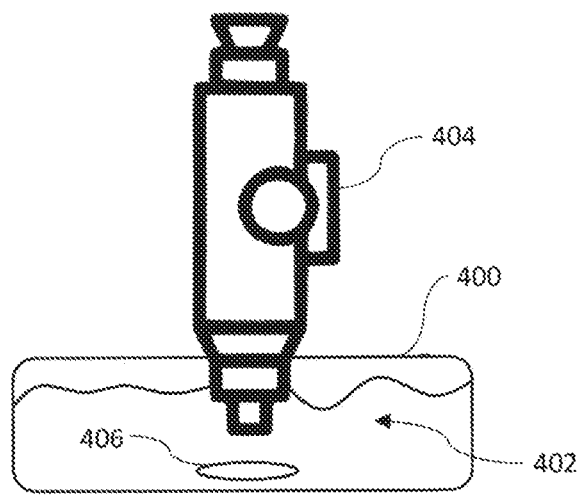
FIG. 4 illustrates a water immersion objective, allowing both the objective lens and the specimen to be immersed in a fluid, such as water.

Such a lens is shown in FIG. 4, where the lens 404 is immersed in the same fluid 402 as the specimen 406. In this figure, a dish 400 (e.g., Petri dish) is used to house both the fluid 402 and the specimen 406. Water immersive lenses are manufactured by companies such as Olympus, Zeiss, Leica, and Nikon, and may include a nose (or dipping cone) housing the front lens, which is tapered at (roughly) a 43-degree angle to allow a steep inclination of approach, providing easy access to the specimen. These objectives (typically) also have a long working distance ranging from 2.0 mm (60× Pan Fluorite) to 3.3 mm (10×-40× Plan Fluorite), which are useful in allowing additional room for micromanipulation of the specimen. It should be appreciated that while certain water immersive objectives have been discussed herein, the present invention is not limited to any particular objective, waterproof or otherwise.

Figure 5:
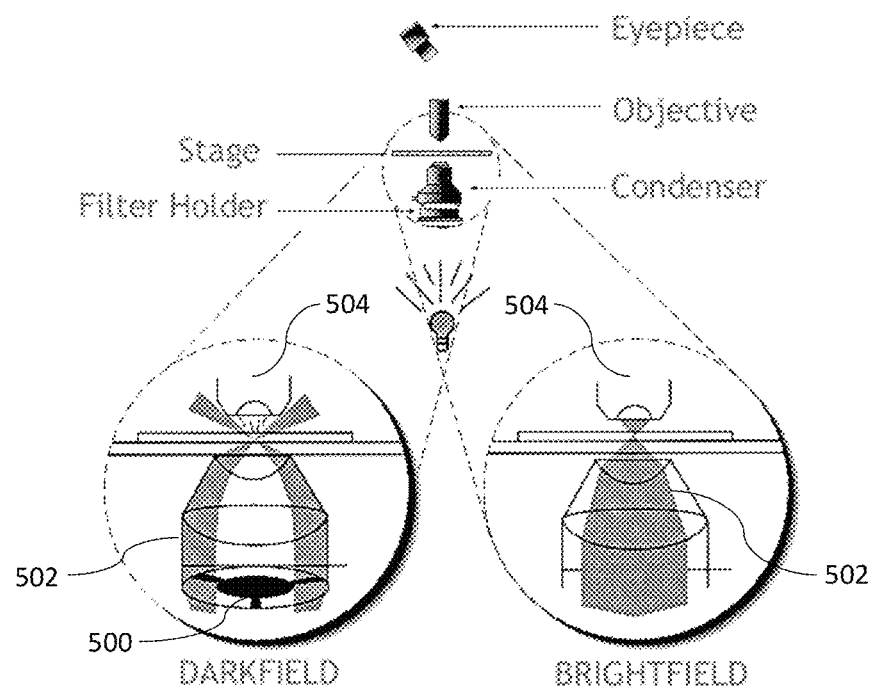
FIG. 5 illustrates a microscope using both bright-field and dark-field techniques.
Figure 6:
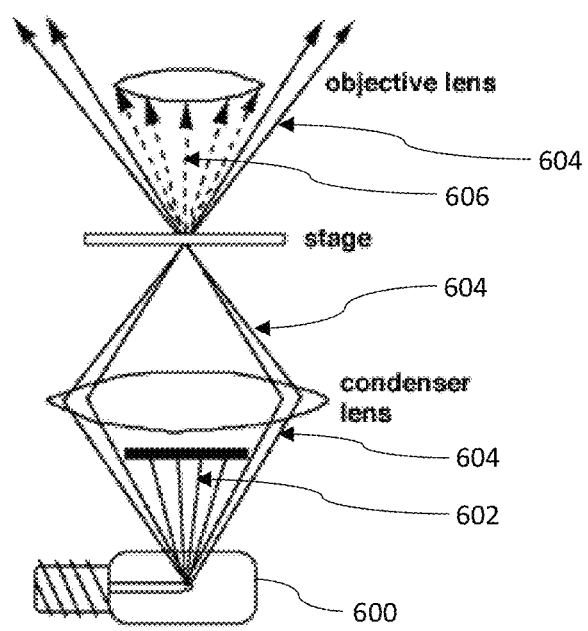
FIG. 6 illustrates how dark-field techniques block light from directly entering the objective lens.
Figure 7:
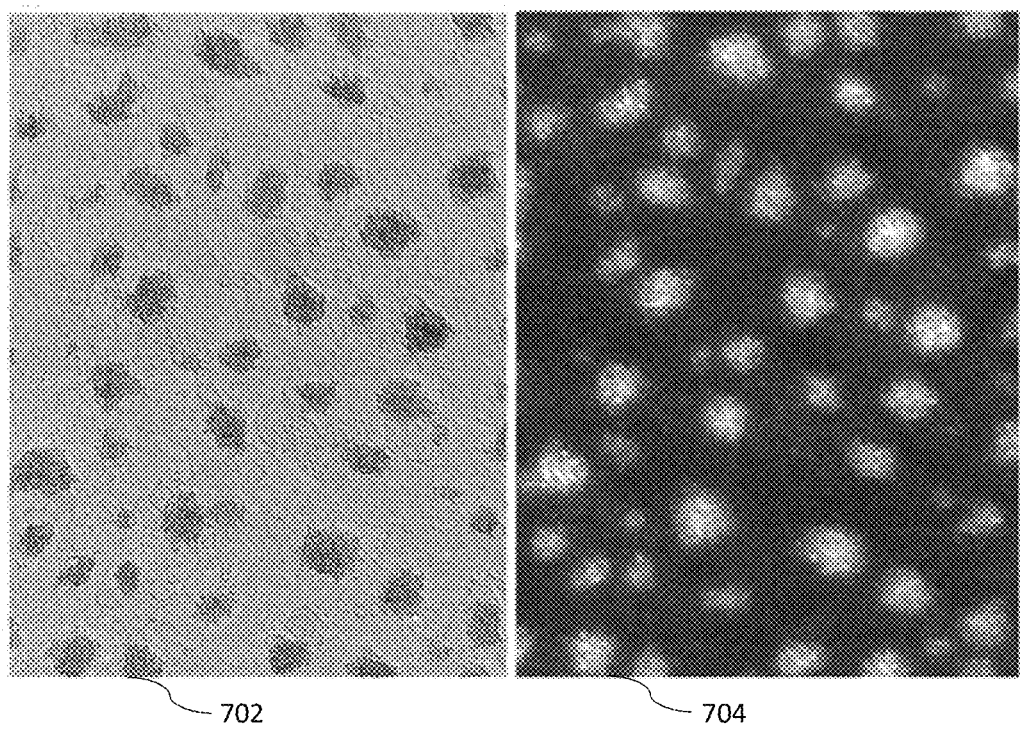
FIG. 7 compares specimens that are being viewed using both bright and dark-field techniques.

And because the light reflecting off (or illuminating) the specimen is the optical signal of interest (e.g., includes the audio frequency modulated electromagnetic energy), the inventor has also discovered that optical staining, such as dark-field, is advantageous to the present invention. Dark-field techniques can be achieved, for example, using a "patch stop" (see FIG. 6), which block direct light 602 from entering the objective lens. See, e.g., FIG. 6 (showing that the direct light 604 that is passed through the condenser lens does not enter the objective lens). In dark-field, the light received by the objective lens is not direct light 602, 604, but instead reflected light 606 from the specimen. This is further illustrated in FIG. 5, where dark-field (e.g., using a "patch stop" 500) prevents direct light 502 from entering the objective lens 504, whereas bright-field allows direct light 502 to enter the objective lens 504. Slides using bright and dark-field techniques can be seen in FIG. 7, with slide 702 using bright-field techniques, and slide 704 using dark-field techniques. As can be seen, in dark-field, it is the specimen(s) that is illuminated, allowing sound energy of interest to be more easily acquired.

It should be appreciated that while dark-field techniques have proven advantageous, the present invention is not so limited. For example, other optical techniques generally known to those skilled in the art (e.g., phase contrast dispersion staining, Becke' line dispersion staining, oblique illumination dispersion staining, objective stop dispersion staining, Schlieren techniques, shadowgraph techniques, etc.), or combinations thereof, are within the spirit and scope of the present invention (a greater discussion of this is provided below). It should also be appreciated that use of the present invention is not limited to the production of multimedia content, or creating a microorganism cinematic experience. By way of example only, because different specimens produce different sounds, acquisition and analysis of sound energy could prove useful in the field of cytometry, or to otherwise classify organisms found in particular environments.

Figure 11:
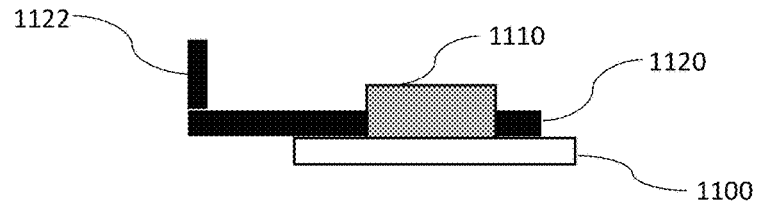
FIGS. 11 and 12 illustrate tracking features included in certain embodiments of the present invention.

Because certain organisms move rapidly, a tracking system may be used to position (or maintain) the organism under the objective lens. For example, as shown in FIG. 11, a manual tracking system may be employed that includes a clamp 1120 that goes around a container 1110 (e.g., Petri dish) that houses the organism (not shown), where the container is supported vertically via a stage 1100. While knobs (e.g., course and fine focus knobs, as previously discussed) may be used to move the stage 1100, and therefore the container 1110, in the Z direction, the clamp 1120 may be used to move the container 1110 in a two-dimensional space (e.g., in the X and/or Y directions). The tracking system may include a handle 1122 affixed perpendicularly to the clamp 1120, where the handle 1122 is configured to be gripped by the user and used to move the container 1110 in relation to the stage 1100 and/or objective lens (not shown).

Figure 12:
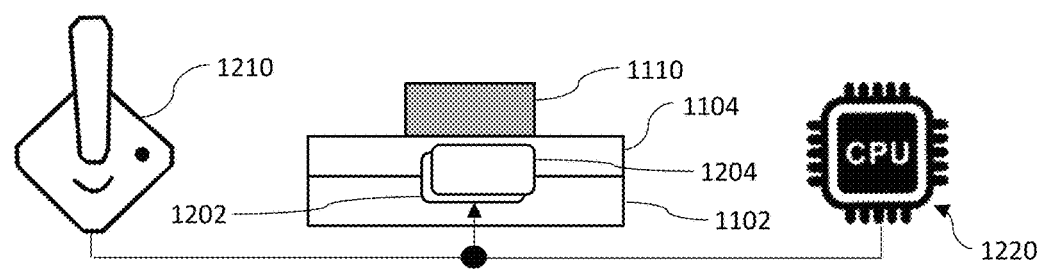

In other embodiment, the tracking system may be motorized and/or automated. In one embodiment, as shown in FIG. 12, a joystick 1210 may be used to control a plurality of motors 1202, 1204, which are used to move the container 1110 in relation to the objective lens (not shown). This may be accomplished by using at least a plurality of motors 1202, 1204, an upper stage 1104, and a lower stage 1104, where the upper stage 1104 is configured to move horizontally in relation to the lower stage 1102. For example, by driving the first motor 1202 in a first direction, a first gear (e.g., first worm gear) (not shown), can be used to move the upper stage 1104 in the positive X direction, and by driving the first motor 1202 in a second direction, the first gear can be used to move the upper stage 1104 in a negative X direction. Similarly, by driving the second motor 1204 in a first direction, a second gear (e.g., second worm gear) (not shown), can be used to move the upper stage 1104 in a positive Y direction, and by driving the second motor 1204 in a second direction, the second gear can be used to move the upper stage 1104 in a negative Y direction. In this embodiment, the electrical signals from the joystick 1210 can be provided directly to the motors 1202, 1204, or can be provided to a CPU 1220. With respect to the latter, the CPU 1220 may be configured to generate signals for controlling the motors 1202, 1204 based on signals received from the joystick 1210.

In another embodiment, as shown in FIG. 12, software operating on the CPU 1220 may be used to automatically track an organism within the container 1110. This may be accomplished, for example, by using software to monitor images of the organism (see, e.g., FIG. 2A, Ref. No. 212). If the software detects movement in the positive X direction, then the CPU 1220 may drive the first motor 1202 in the first direction, and if the software detects movement in the negative X direction, then the CPU 1220 may drive the first motor 1202 in the second direction. Similarly, if the software detects movement in the positive Y direction, then the CPU 1220 may drive the second motor 1204 in the first direction, and if the software detects movement in the negative Y direction, then the CPU 1220 may drive the second motor 1204 in the second direction. Such software may also be used to digital tracking an organism if a digital zoom is being used to focus (or zoom in) on the organism within a larger environment. It should be appreciated that the present invention is not limited to any particular tracking system, or the use of any tracking system at all. It should also be appreciated that any tracking system used can be configured to track at least one specimen in a two-dimensional space (e.g., X and/or Y) or in a three-dimensional space (e.g., X, Y, and/or Z), depending on design requirements.

Figure 14:
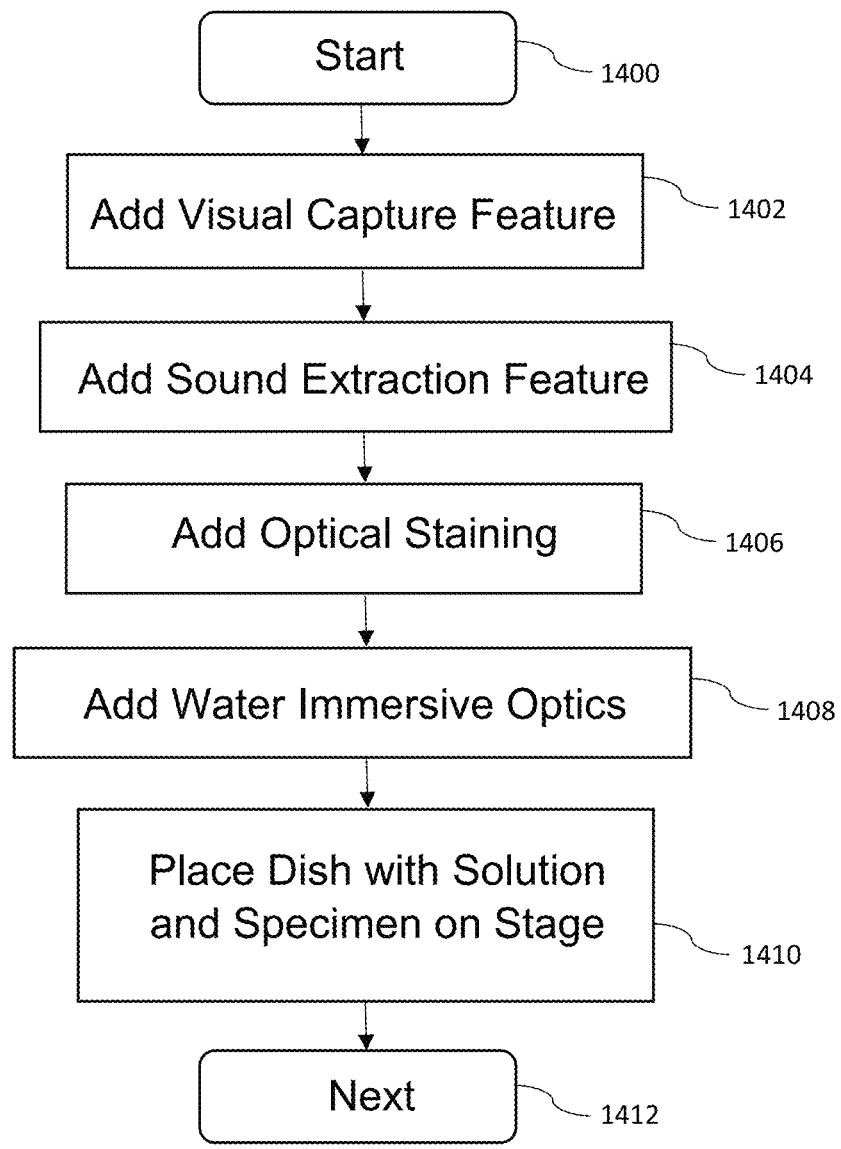
FIG. 14 provides a method for modifying a microscope to allow for at least aural observations in accordance with one embodiment of the present invention.

A method for modifying a microscope in accordance with one embodiment of the present invention is shown in FIG. 14. Starting at step 1400, the microscope is modified by adding a visual capture feature at step 1402. As discussed above, this may be a sensor that is dedicated for aural observation, or a sensor that allows for both aural and visual observations. In step 1404, a sound extraction feature is added. As discussed above, this may include a pre-amplifier, a filter, etc. The function of the sound extraction feature is to receive an optical signal (or an electrical conversion thereof) and to provide (e.g., output) at least aural data. As discussed above, the aural data can then be displayed, played, etc. Optical staining, such as dark-field staining, may be added at step 1406. A water immersive objective lens may then be added at step 1408. A dish (e.g., Petri dish) containing at least one specimen in a fluid is then placed on the stage at step 1410, ending the method at step 1412. It should be appreciated that the present invention is not limited to method shown in FIG. 14, and that fewer, different, and/or additional steps are within the spirit and scope of the present invention. For example, a method that does not involve optical staining, or involves multiple visual capture features, is within the spirit and scope of the present invention.

Figure 15:
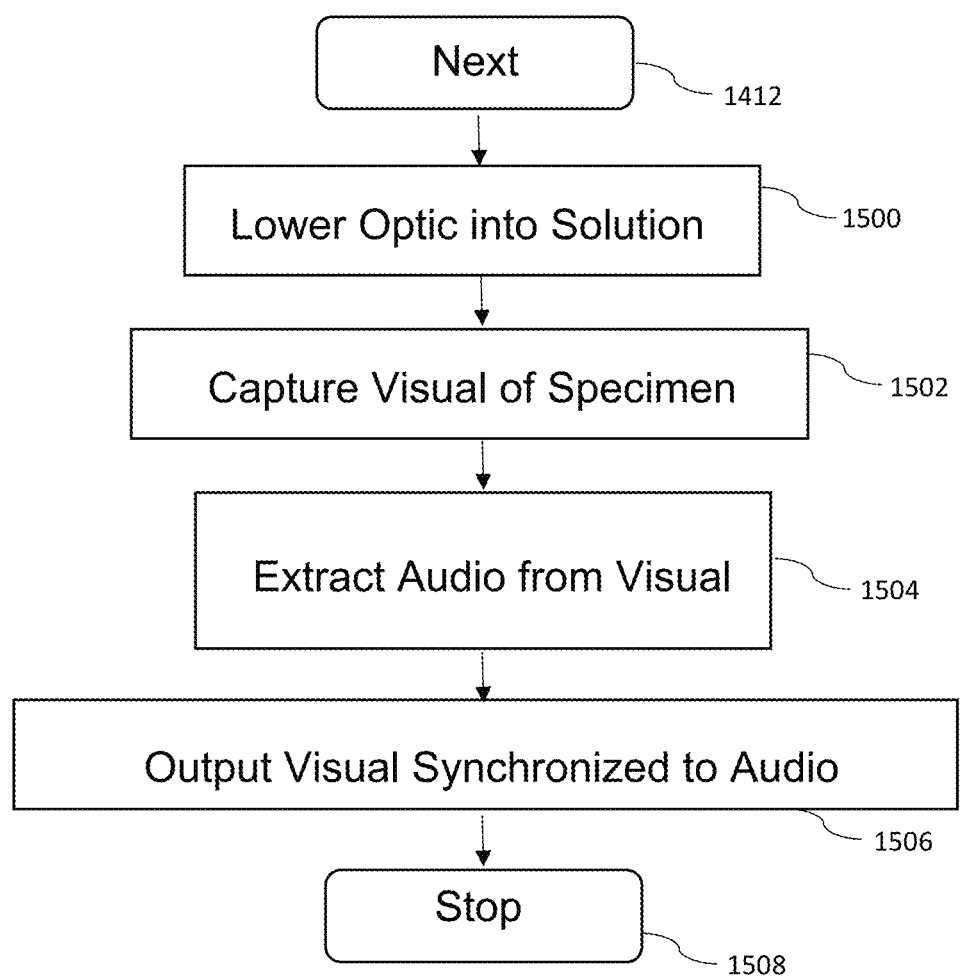
FIG. 15 provides a method for operating the microscope described in FIG. 14 in accordance with one embodiment of the present invention.

Once the microscope is constructed, it can operate as shown in FIG. 15. For example, starting at step 1412, the water immersive objective lens may be lowered into the fluid at step 1500. Once the lens is focused/aligned (e.g., using the focus and/or tracking techniques discussed above), at least one visual of the specimen is captured at step 1502. As discussed above, this may be a visual that is dedicated to aural observation or a visual that is used for both aural and visual observations. Aural data is then extracted from the visual data at step 1504 and output in time synchronization with video (or image) data at step 1506, ending the method at step 1508. It should be appreciated that the present invention is not limited to the method shown in FIG. 15, and that fewer, different, and/or additional steps are within the spirit and scope of the present invention.

Experimental Observations of Certain Embodiments

Figure 8:
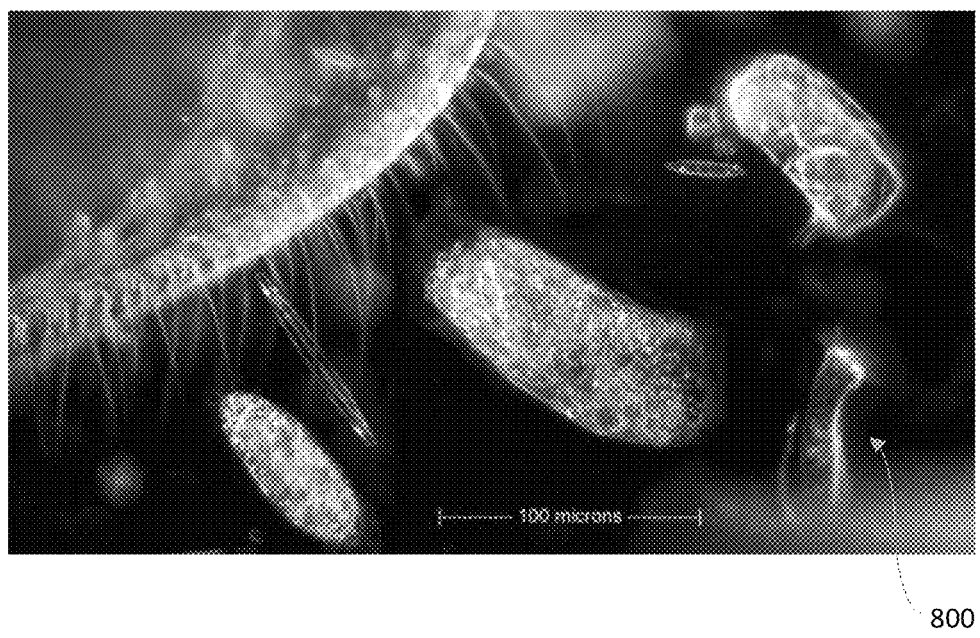
FIG. 8 illustrates organisms visually observed using an embodiment of the present invention.
Figure 9:
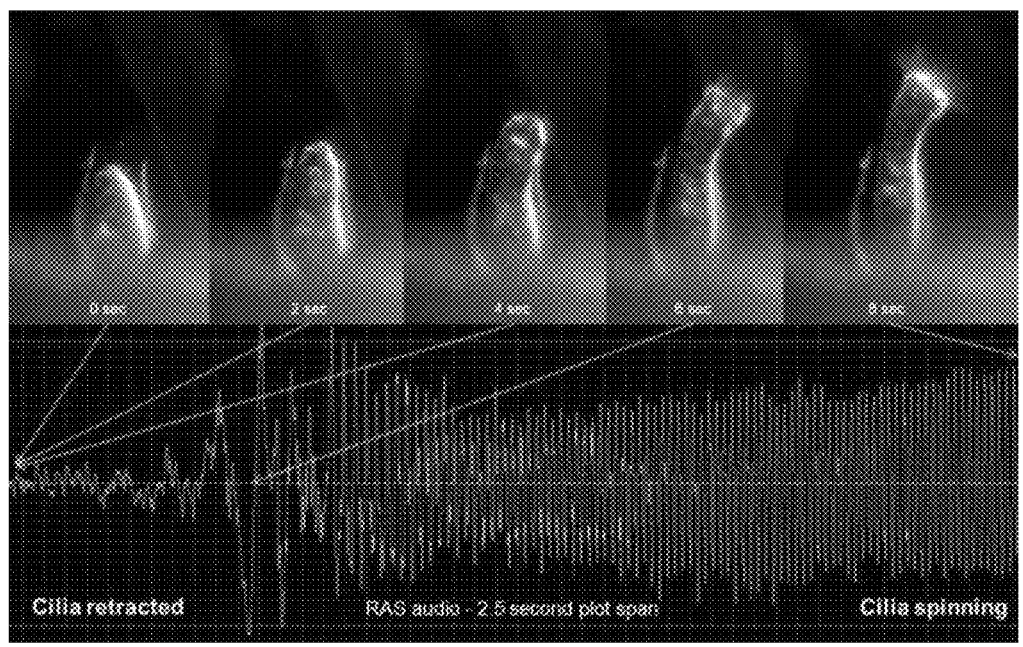
FIG. 9 illustrates organism visually and aurally observed using an embodiment of the present invention.
Figure 10:
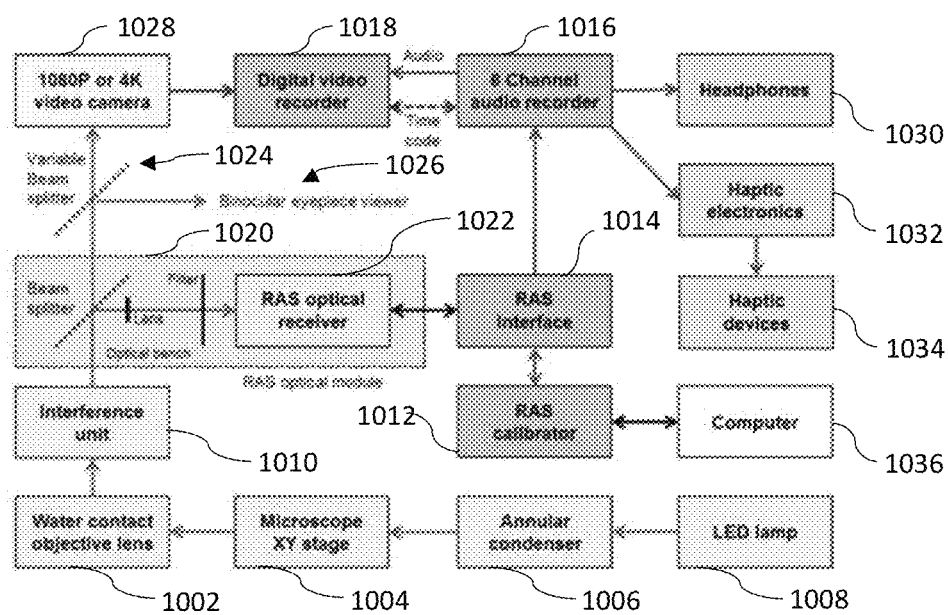
FIG. 10 illustrates a block diagram of one embodiment of the present invention.

In testing the present invention, the inventor constructed a device that followed (basically) the block diagram illustrated in FIG. 10, which produced the results shown in FIGS. 8 and 9. FIG. 8 shows a plurality of organism in their natural environment, certain ones of which having cilia 800. FIG. 9 shows the same cilia in two second intervals over an eight second period, going from retracted to spinning. FIG. 9 also shows sound energy produced by the cilia spinning during a two and a half second period. The following are the testing procedures that were used and the inventor's experimental observations.

Free swimming protozoa (by way of example) and other bio-activity produces localized sounds, motions and vibrations that weakly modulate the ambient illumination within a micro-aquatic environment. An optical sensor can detect these faint audio frequency optical intensity modulations and can be made sensitive to phase, polarization, scattering and other optical phenomena through the use of microscopic optical staining techniques. Optical staining significantly improves both the visual image quality and aural sensitivity. With localized acousto-optic sensitivity, monophonic or stereophonic (multichannel) sound can be extracted and synchronized with high definition video to create a more immersive cinema view into these aquatic micro-environments. Much of the micro-acoustic activity is relatively low frequency, spatially resolved and well suited to multichannel haptic and tactile feedback. Examples of visual and aural micro-aquatic observations are provided herein.

The imaging aspect of this microscope is conventional although optimized for this application. Imaging enhancements include (but do not require) a high definition video camera, optical staining for both visual and aural use, the use of water contact optics to better roam throughout the aquatic micro-environments and stabilize the optical staining process, a fast mechanical joystick controlled XY stage for effective micro-organism tracking, and LED illumination to minimize thermal distress. While LED illumination is preferred, a direct current (DC) incandescence light bulb can also be used. A DC light source is preferred because it minimizes fluctuation, or light flicker, and provides a superior optical signal for carrying sound energy. In certain embodiments, sunlight can also be used as the light source. See, e.g., FIGS. 2E and 2G.

Sounds within the aquatic micro-environment are sensed using Remote Acoustic Sensing (RAS) technology, or an AFMS device. It is believed that this is the first use of this technology for listening to the sounds produced by aquatic microorganisms within their environment. Some of the sounds are associated with cilia motion and propulsive activity. Other sounds result from various periodic oscillations and with protozoa colliding into each other and other micro flora and fauna. Many rotifers with their spinning cilia produce low frequency drone sounds occasionally interrupted by nearby disturbances. Other sounds are caused by very rapid body motions. As many of the micro fauna are transparent, some sounds have been associated with protozoa within the digestive tract of other larger metazoa. Some of the sounds are similar to aircraft, some like cars, others like colored and 1/f noise, others make periodic or random pulsing sounds, and others are hard to describe. The microorganism sounds are often species specific and sometimes even specific to individual animals.

There are a variety of acousto-optic modulation and emission mechanisms, some of which have been previously described in the context of observing distant aerospace vehicles. See, e.g., Ser. No. 15/230,369. In some cases, the sounds result from acoustic propagation of pressure waves and in other cases, are the result of non-acoustic optical intensity or phase variations at audio frequency rates. Several AOM mechanisms applicable to the micro-aquatic environment include:

Absorptive AOM: Rapidly moving cilia and larger opaque or partially opaque micro-aquatic fauna cause absorptive optical intensity modulation at audio frequency rates. In this case, the optical modulation is usually the direct result of the fauna motion and not as an acoustic pressure wave although the fauna motion does also produces a weaker propagating acoustic pressure wave throughout the micro-aquatic environment.

Reflective AOM: In the presence of dark field illumination, the micro-fauna appears as bright animals in front of a dark background. This is due to the oblique illumination reflected by the fauna into the microscope objective. Audio frequency energy sources within the micro-aquatic environment modulate the reflectivity at audio rates which then is detected as audio frequency optical intensity variations. Air bubbles as reflective spherical membranes provide another type of a reflective acousto-optic modulator.

Refractive AOM: Protozoa and other micro-fauna are largely transparent and mostly invisible with conventional bright field (transmitted) illumination. Their refractive index is different than water so both dark-field and interference staining techniques can greatly enhance their visibility and acoustic detectability. As the micro-fauna bodies are compressible and compliant, their optical modulation is likely the result of acoustic pressure waves propagating through both the water and fauna.

Optical emitters: Bio luminescence may result in audio frequency emissions. So far, audio frequency bio-luminescent emissions have not been experimentally observed due to a lack of specimens.

The reflective, refractive and absorptive AOMs produce audio frequency intensity and phase modulations. RAS sensitivity is a function of the signal level and noise background. In general, the level of the audio frequency modulated signal component should be maximized and all other terms (steady state illumination, sensor noise, etc.) should be minimized.

Shot noise is the result of individual photons arriving at the detector. The noise level power is related to the square root of the intensity. Shot noise is minimized by reducing steady state background illumination through the use of optical staining techniques. One of the more effective techniques is to use dark-field illumination where only active fauna are visible. Color difference interference polarization staining results in more background light than dark-field but sometimes show details that are not visible with dark-field illumination. Placing a narrow band filter in the RAS channel when using interference polarization produces an exceptionally dark background, but at the expense of some light loss due to the narrow filter passband.

The RAS detector noise is a function of the detector area, photodiode process specific noise terms, Johnson thermal noise and the detector preamplifier design. Detector noise can be minimized by proper detector selection and circuit design. Increasing the overall light intensity generally helps but this can cause fauna health and detector saturation problems. LED illumination (while not necessary) works well as the microscope light source, but it may be necessary to confirm that the LED electronics do not cause any light intensity modulation in the audio spectrum.

Other potential noise sources include optical interference, electrical interference and mechanical vibrations of the microscope. Optical interference is common from fluorescent and other room lamps but can be easily eliminated. Even unmodulated ambient daylight illumination can increase the shot noise background. Electrical interference from the video camera or other electronics into the highly sensitive RAS detectors can be more difficult to control. Mechanical vibrations of the microscope will couple into the micro-aquatic environment and be heard through the RAS detectors. RAS noise tests should be made with the microscope lamp, video system, room lights, etc., each separately cycled on and off.

Maximum acoustic sensitivity is achieved by maximizing the acoustically modulated signal component level, minimizing unmodulated detector illumination and matching the AOM area to the detector sensitive area, ideally as a spatially matched filter. The transfer function from an acoustic source in the micro-aquatic environment to the RAS detector output can be determined by a tristatic communication link model. The three links are the optical illumination of the AOM, the acoustic energy arriving at the AOM and the propagation path from the AOM to the optical receiver. The acoustic signal level is a function of the illumination level, the acoustic level, the AOM modulation efficiency, microscope optics and the RAS detector.

Many microscopic fauna and flora are transparent and nearly invisible when viewed with conventional bright-field (transmitted light) microscopes. Improving the visibility is important both for the picture and sound elements. Chemical staining of microscopic specimens with dyes greatly improves visibility but is not compatible with live animal viewing. A variety of optical staining techniques have been developed over many years to provide non-chemical staining alternatives. These provide a wide range of visibility enhancement mechanisms that can enhance color and contrast. There are many variations but optical staining generally relies on optical scattering, polarization or optical interference phenomena.

Optical scattering or dark-field techniques involve illuminating the scene in a way that direct illumination does not enter the microscope objective lens. There are many variations based on the scattering geometry including forward, back and side scattering. Forward scatter illumination is normally called dark-field. Illumination from oblique angles behind the object is forward scattered by the object toward the observer who sees the bright object against a black background. Dark-field illumination used with lower power microscope objective lenses is simple to implement, low cost and effective. A conventional bright field Koehler illuminated condenser lens can be converted to dark-field illumination simply by placing an annular mask into the condenser lens filter holder to block the direct illumination. Some bright-field condenser lenses include an iris and lateral shift capability to produce an oblique forward scattered dark-field illumination cone at a specific offset angle. Annular, oblique and various intermediate forward scatter variations were used in this project. Other optical scattering illumination methods use illuminated fiber tips or LEDs positioned appropriately (side scatter) or epi-illumination (back scatter) along with colored stained forward scatter methods such as Rheinberg illumination.

Polarization techniques work well with polarization sensitive specimens such as minerals and are an essential element of a petrographic microscope. Polarization staining does not work well with most microorganisms as most do not significantly affect the light polarization. However, combining polarization with interference or dark-field techniques can provide some very interesting and artistic imagery, particularly when protozoa and sand grain crystals are mixed.

Interference staining techniques convert phase (optical time delay) differences into optical intensity and color differences. Transparent micro fauna and flora become highly visible with the intensity or color differences produced by varying optical propagation delays. There are many variations including phase contrast (Phaco), differential interference contrast (DIC), Michelson interferometers and interference phase. Hardware for interference staining tends to be more expensive and complex to use than the other optical staining methods but can image microscopic structures that would otherwise be invisible.

Interference phase color difference and contrast staining were used for these experiments as this accessory was available. Fortunately, the interference phase system is well matched to this application for a variety of reasons including good background light suppression as needed for RAS, native support for a broad spectrum of optical staining techniques and direct compatibility with the water contact objective lenses. Interference phase staining operates on the principle of using polarization to control the mutual interference between two light paths, one coming directly through the specimen and the other diffracted and brought into interference with the first path. Depending upon the presence or absence of a narrow band optical filter, it provides either contrast or color difference staining. Phase differences can be calibrated in terms of the interference colors.

The interference phase hardware consists of two main units, a special condenser lens assembly and an interference unit that fits between the microscope body and trinocular viewing head. The condenser lens assembly with annular rings is like those used for phase contrast imaging. The fairly-complex interference unit includes an adjustable polarizer to vary the phase difference between the two paths, a ¼ wave plate, a set of phase rings on an indexed slider and an adjustable analyzer to vary the interference mixing ratio (contrast difference) along with several other lenses and folding prisms. The accessories include a centering telescope used for alignment and a narrow band optical filter used for contrast imaging. The RAS detector assembly with a beam splitter is mounted between the interference unit and trinocular head. A narrow band or band reject filter in the RAS optical path only improves the acoustic sensitivity by reducing background illumination levels using interference phase contrast while simultaneously using the color difference mode in the visual channel. The interference phase system is quite versatile and adaptable and can be reconfigured to other optical staining methods including bright-field, dark-field, oblique illumination, phase contrast and polarization along with a broad variety of interesting intermediate combinations.

So far, the best microRAS results have been obtained with optical staining techniques that produce a dark background to minimize shot noise. These include annular and oblique forward scatter dark-field illumination and interference phase contrast. Simultaneous interference phase color difference imaging is possible with the optical bandpass filter removed from the visual channel. This results in a pleasing visual image yet with the desirable dark background in the RAS sensor path. Interference phase also provides a better visibility of certain protozoa structures than the more conventional dark-field methods. Interference phase requires brighter illumination than dark field due to polarization and other light losses.

There were two fundamental requirements for this project, i.e., first, the fauna and flora need to be alive, healthy and free to move, and second, the microscope should be capable of producing artistically interesting cinema quality video imagery along with multichannel sound. The prototype microRAS system was based on a Nikon S-Ke optical microscope with adaptations to include high definition video recording and multichannel in situ audio recording.

LED Illumination: The microscope was modified to use LED illumination. Advantages of LED illumination include the higher brightness needed to better support the multiple optical paths, minimal UV, IR and heat as needed for the micro-organism health and a longer lamp life. The existing microscope lamp was replaced with a 1.1 watt BA15D/1142 LED spot light bulb with a 6000K color temperature and 85 lumen output. This lamp output is sufficient for dark-field but a brighter lamp is desirable for interference phase. The lamp and high definition video camera were operated from regulated 12 volt power supply. Although this lamp internally uses a switching power converter, it does not produce any audio frequency intensity noise. There is some color variation across the LED emitter but it is acceptable for this prototype system.

Microscope objective lenses: Microscope objective lenses in the 4× to 40× range were used to view the free-swimming fauna and flora. Standard microscope objective lenses are designed for viewing through air into a thin glass cover slip that is in direct contact with the specimen. Several problems occur when instead using these objectives to view directly into a water environment. The water depth must be limited to prevent direct water immersion and the variable water optical path length along with a lack of a glass cover slip can cause spherical aberration at higher magnifications. A varying surface curvature at the air to water interface is produced by surface tension and water evaporation. This will cause a misalignment of the optical staining hardware resulting in a loss of visual image quality and acousto-optical modulation depth. Even at lower powers, the microscope will need to be frequently refocused and the optical staining hardware will need frequent realignment. A better choice is to use microscope objectives specifically designed for direct water immersion, completely eliminating an air to water boundary. With these lenses, there is no change in optical performance with water depth, evaporation or any destabilization of the optical staining process. The prototype system used a pair of Nikon 10× and 20× water contact objectives (77798 & 77803) with an 8 mm depth capability.

Optical staining: Forward scatter (annular dark-field & oblique) illumination and interference phase optical staining methods used in these experiments. Dark field and oblique illumination was obtained, either using a Nikon Achromatic 5 lens condenser with iris, oblique illumination slider and filter holder (77894) augmented a set of dark-field diaphragms or with the annular ring condenser assembly from the interference phase accessory (77000). Interference phase imaging required using both the special condenser lens assembly and the interference unit that fits between the microscope body and trinocular head. All of these optical staining methods are compatible with both the conventional and water contact objective lenses.

Trinocular viewing system and camera port: A Nikon type U trinocular head (77759) provides direct binocular viewing, a camera port or a 50% combination of the two. Direct binocular viewing, combined with RAS audio in headphones provides an immersive experience with a sharp, wide angle HDR view and was commonly used for general exploration and when tracking fast moving fauna. One of the binocular eyepieces includes a reticule for camera and RAS targeting (77880). The eyepiece port is also used with the centering telescope to align the optical staining hardware. Some microscopes include a switchable Bertrand lens which eliminates the need for a separate centering telescope.

High definition video imaging: A Marshall Electronics CV342-CS C-mount 1080P30 video camera was mounted directly to the trinocular camera port using a custom C-mount adapter. This camera provided a 430 micron horizontal field of view when using the conventional 10× air objective lens, 400 microns with the 10× UW lens and 200 microns with the 20× UW lens.

The camera HD-SDI output was connected to a Sound Devices Pix240i broadcast digital video recorder that also records two RAS audio channels.

XY specimen positioning stage: The micro-aquatic environment was contained within a 60 mm diameter optical grade Petri dish (Corning 25010). The microscope included a Nikon type R rectangular mechanical stage (77765) to position the Petri dish. The Nikon type R microscope stage was modified to include a small joystick handle making it much easier to follow moving subjects than the normal method of stage positioning with a coaxial XY knob pair.

Remote acoustic sensor (RAS) assembly: The microRAS assembly fits between the microscope and trinocular viewing head. This prototype included a beam splitter, a focusing lens, the photo-receiver and the associated support electronics. A modular optical bench was used so that a variety of experimental configurations could be readily explored. A single radiometer channel provides monophonic audio while a 4 channel version provides stereo and quadraphonic outputs. Additional details about the RAS photo-receiver are described above and in the co-pending application Ser. No. 15/230,369, the subject matter of which is incorporated herein by reference. A computer controlled calibration system supports RAS alignment, calibration and performance measurements. The RAS outputs are connected to a Sound Devices 633 audio recorder that supports up to 6 audio channels with time code synchronization. A stereophonic audio mix is then passed to the Sound Devices Pix240i video recorder.

It should be appreciated that the AFMS photodetector by itself is only sensitive to audio frequency light intensity variations. The light received by the AFMS detector includes both unmodulated light that carries no acoustic information and acousto-optically modulated light that carries acoustic information. It is desirable to minimize interference from unmodulated light so as to maximize the sensitivity to the acousto-optically modulated light. Optical staining improves the acoustic sensitivity by reducing unmodulated light and increasing the intensity modulation depth of the acoustically modulated light. There are three basic optical staining approaches used for acousto-optic sensing:

Intensity modulation enhancement—Unmodulated light that carries no acoustic information is reduced by redirecting it away from the sensor. This includes dark field and oblique illumination techniques. The sensor now primarily receives acousto-optically modulated light.

Conversion of acoustically modulated optical path length variations into light intensity variations—The AFMS device can be made sensitive to acoustically modulated path length variations within an organism. For example, a vibrating surface within the organism will change the optical path length or time delay at an audio rate. Various forms of interferometry can convert the acoustically modulated path length difference between the organism acoustic vibrations and a reference optical path into a light intensity signal that is usable by the AFMS device. Examples of suitable interferometry techniques include phase contrast methods, interference phase, Nomarski, etc. These approaches convert phase shifts in light passing through a transparent organism to brightness changes in the image. The time delays and corresponding phase shifts themselves are invisible, but become detectable by AFMS when converted into light intensity variations.

Conversion of acoustically modulated polarization into light intensity variations—Adding a pair of crossed polarizers to the optical system will suppress steady state illumination. A vibrating object between the polarizers that changes the polarization state will change the light intensity with the AFMS device is sensitive to at an audio rate.

The RAS signals from the micro-aquatic environment are predominantly low frequency with most of the energy below 500 Hz. Many of the signals are produced by fauna swimming, cilia and feeding motions. Multichannel haptics corresponding to the spatially distributed RAS detectors can provide haptic feedback as to fauna motion and activity. Another interesting idea to consider is that the haptics and audio can be bidirectional, creating a so-called Protozoa petting zoo.

Initial experiments used a Texas Instruments DRV2605EVM-CT haptics evaluation kit. The evaluation module (EVM) audio input was connected to one of the RAS audio mix outputs. This provided a simple and effective first attempt to feel the vibrations produced by the micro-aquatic life. Rotifers with their periodic cilia retractions and other motions provided a good demonstration. This was followed by further experiments with a more powerful small electromagnetic shaker. A first attempt was made at using haptic feedback to the micro-fauna but this resulted in a haptic/RAS feedback loop.

The microorganisms are unconstrained and free to move in three dimensions. Some fauna including the sessile Cothurnia rotifer are stationary. Others move slowly making them relatively easy to follow. Some of the micro fauna move very fast with erratic paths. Manual tracking of these animals is difficult to impossible, and may require automated tracking (discussed above). The fastest animals produce a single RAS pop sound and then completely vanish from the scene in the blink of an eye (less than one video frame time). Wide-area, high-resolution, high-speed, wide-dynamic range video cameras are one possibility but technology will need to be further developed. Solving the high-speed motion problem requires either a faster tracking system or protozoa motion constraints. Manual XY stage tracking works to a point but faster motion would require some type of an auto tracker, either video or acoustically based. As a side note, additional sensory information provided by RAS has been effectively used to acoustically aid visual tracking of rapidly moving aerospace vehicles (see Ser. No. 15/230,369, the subject matter of which is incorporated herein by reference).

Constraining or otherwise slowing micro-fauna motion is another option. This can be done in various ways with varying degrees of micro fauna friendliness. Simple appropriate methods include adding more naturally occurring bio-materials or other barrier material or reducing the amount of water in the micro-aquatic environment. The fauna seem to like to hide and slowdown in plant life regions and that also helps to ease the tracking requirements. But then the fauna is harder to find and clearly photograph. Many times, sessile rotifers were first located acoustically and then visually found well hidden in their environments. Sometimes larger transparent fauna eat the smaller protozoa leaving the prey naturally well constrained. Other active and dynamic constraints may be possible including piezoelectric devices, micromanipulators, galvanic and electrolytic systems. Dynamic active constraints could be used for haptic feedback and interaction with the micro-fauna.

In testing the invention, the general philosophy was to observe organisms in as close to normal environmental conditions as possible. No chemicals were added and the fauna and flora were not unnaturally constrained other than by the water volume within the 60 mm diameter Petri dish. Light and heat levels were controlled to minimize environmental stresses.

This study focused on fresh water micro-aquatic environments. This environment was chosen because of the convenient availability of a wide diversity of microscopic fauna and flora. Also important was that an in-water environment is acoustically isolated with minimal acoustic coupling to an air environment. Other fluid environments include sea water micro-aquatic environments and body fluids such as dynamic white blood cell activity. Other micro-environments, such as air, are also interesting. Audio frequency vibrations, such as insect wing motion, are weakly coupled as sound waves and are easily observable with optical sensors.

It should be appreciated that the present invention is not limited to the block diagram shown in FIG. 10, or the experimental details provided above. The present invention can be used in any number of ways, to aurally (and/or visually) observe any number of specimens. While the inventor made design choices in carrying out his experimentations, those design choices are not limitations of the present invention, and those skilled in the art will appreciated that various modifications can be made, depending on the type and/or number of specimens that are being observed, and the specific goals that are to be achieved.

Having thus described several embodiments of a system and method for using a microscope to aurally observe a specimen in a fluid (e.g., water, air, etc.), it should be apparent to those skilled in the art that certain advantages of the system and method have been achieved. It should also be appreciated that various modifications, adaptations, and alternative embodiments thereof may be made within the scope and spirit of the present invention. The invention is solely defined by the following claims.

What is claimed is:

1. A microscope for aurally observing at least one organism, comprising:
    a light source;
    a container comprising a fluid and said at least one organism;
    an optical staining device;
    an audio frequency modulation sensing (AFMS) device adapted to convert an optical signal from said at least one organism into an electrical signal and to extract aural data therefrom;
    a digital video camera for capturing at least one visual of said at least one organism, said at least one visual being output in time synchronization with said aural data; and
    at least one beam splitter for splitting a first optical signal from said at least one organism into at least said optical signal and a second optical signal, said optical signal being provided to said AFMS device, and said second optical signal being provided to said digital video camera;
    wherein said optical staining device decreases the amount of light unmodulated by said at least one organism in said optical signal received by said AFMS device and increases a signal-to-noise ratio ("SNR") of said optical signal received by said AFMS device.

2. The microscope of claim 1, wherein said aural data is based on audio frequency modulated electromagnetic energy in said electrical signal.

3. The microscope of claim 1, wherein said electrical signal is used to generate video data that is output in time synchronization with said aural data.

4. The microscope of claim 1, wherein said optical staining device comprises a dark-field illuminated condenser lens.

5. The microscope of claim 1, further comprising an objective lens for magnifying said optical signal prior to said optical signal being provided to said AFMS device.

6. The microscope of claim 5, wherein said objective lens is configured to be submerged at least partially in said fluid.

7. The microscope of claim 1, wherein said AFMS device comprises a plurality of sensors, a first one of said plurality of sensors is used to convert said optical signal into said electrical signal, a second one of said plurality of sensors is used to convert a third optical signal into a second electrical signal, and other aural data is extracted from said second electrical signal, wherein said aural data and said other aural data are used to create stereophonic sound.

8. A method for using a microscope to aurally observe at least one organism, comprising:
    providing the at least one organism in a fluid;
    using a light source to generate a light;
    using an audio frequency modulation sensing (AFMS) device to convert an optical signal from said at least one organism into an electrical signal and to extract aural data therefrom, said aural data being based on audio frequency light intensity fluctuations in said optical signal;
    using a digital camera to capture at least one visual of said at least one organism, said at least one visual being output in time synchronization with said aural data;
    splitting a first optical signal from said at least one organism into said optical signal and a second optical signal, said second optical signal being provided, at least indirectly, to said digital camera; and
    using optical staining to decrease an amount of light unmodulated by said at least one organism in said optical signal and increase a signal-to-noise ratio ("SNR") of said optical signal received by said AFMS device.

9. The method of claim 8, further comprising the step of using said electrical signal to generate a video data, said video data being output in time synchronization with said aural data.

10. The method of claim 8, further comprising the step of using an objective lens to magnify said optical signal prior to said optical signal being provided to said AFMS device.

11. The method of claim 10, wherein said optical staining step further comprises using dark-field techniques to decrease said amount of light unmodulated by said at least one organism in said optical signal by blocking direct light from entering said objective lens.

12. The method of claim 8, wherein said AFMS step further comprises using at least a first sensor to convert said optical signal into said electrical signal, using at least one other sensor to convert at least one other optical signal into at least one other electrical signal, and extracting other aural data from said at least one other electrical signal, said aural data and said other aural data being used to create a multi-channel audio output.

13. A system for at least aurally observing at least one organism, comprising:
    a light source;
    a living organism;
    an optical staining device;
    at least one sensor for converting an optical signal from said at least one organism into an electrical signal;
    means for using audio frequency modulation electromagnetic energy in said electrical signal to provide an audio output, said audio output allowing a user to aurally observe said living organism;

a digital camera for capturing at least one visual of said at least one organism; said at least one visual being output in time synchronization with said aural data; and at least one beam splitter for splitting a first optical signal from said at least one organism into at least said optical signal and a second optical signal, said second optical signal being provided to said digital camera;

wherein said optical staining device decreases an amount of light unmodulated by said living organism from entering said at least one sensor.

14. The system of claim 13, wherein said optical staining device redirects at least portions of said unmodulated light away from said at least one sensor.

15. The system of claim 13, wherein said optical staining device converts acoustically modulated optical path length variations in said optical signal into light intensity variations.

16. The system of claim 13, wherein said optical staining device converts acoustically modulated polarization in said optical signal into light intensity variations.

17. The system of claim 13, further comprising a container comprising a fluid and said living organism.

18. The system of claim 17, further comprising an objective lens for magnifying said optical signal prior to said conversion of said optical signal into said electrical signal.

19. The system of claim 18, wherein said objective lens is configured to be submerged at least partially in said fluid.

20. The system of claim 13, wherein said at least one sensor comprises a first sensor and a second sensor, said first sensor being used to convert said optical signal into said electrical signal, said second sensor being used to convert a third optical signal into a second electrical signal, said means being used to further convert audio frequency modulation electromagnetic energy in said second electrical signal to provide a second audio output, wherein said audio output and said second audio output are used to create stereophonic sound.

* * * * *